United States Patent [19]
Tsuji

[11] Patent Number: 6,088,132
[45] Date of Patent: *Jul. 11, 2000

[54] IMAGE FORMATION APPARATUS

[75] Inventor: Hiroyuki Tsuji, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/243,945

[22] Filed: May 17, 1994

[30] Foreign Application Priority Data

May 18, 1993 [JP] Japan ................................. 5-116223

[51] Int. Cl.⁷ ........................................................ H04N 1/40
[52] U.S. Cl. ........................... 358/471; 358/498; 358/474; 399/368
[58] Field of Search ...................... 358/400, 401, 358/404, 471, 474, 486, 488, 493, 494, 496, 497, 498, 500, 501, 524, 483, 444, 448, 449, 513, 514, 523, 538

[56] References Cited

U.S. PATENT DOCUMENTS

| | | | |
|---|---|---|---|
| 4,814,893 | 3/1989 | Katoh | 358/449 |
| 5,151,797 | 9/1992 | Nosaki et al. | 358/474 |
| 5,198,909 | 3/1993 | Ogiwara et al. | 358/486 |
| 5,373,368 | 12/1994 | Taniguro | 358/438 |
| 5,452,108 | 9/1995 | Muramatsu | 358/474 |
| 5,596,400 | 1/1997 | Kasamatsu et al. | 399/45 |
| 5,708,953 | 1/1998 | Morigami et al. | 399/364 |
| 5,899,611 | 5/1999 | Haneda et al. | 399/309 |

Primary Examiner—Jerome Grant, II
Attorney, Agent, or Firm—Fitzpatrick, Cella, Harper & Scinto

[57] ABSTRACT

An image formation apparatus capable of scanning using an optical scanning unit in both directions of a sub-scanning operation, performing a predetermined image processing on the information read by a CCD, and subsequently storing in a page memory. CPU controls address count of the main scanning address counter and sub-scanning address counter to prevent the image whose output image to the printer is in the reversing direction becomes a mirror image. Accordingly, it is possible to provide an image formation apparatus capable of outputting an appropriate image signal regardless of the direction in the sub-scanning direction of the optical scanning unit, and processing successive duplication at a high speed.

37 Claims, 12 Drawing Sheets

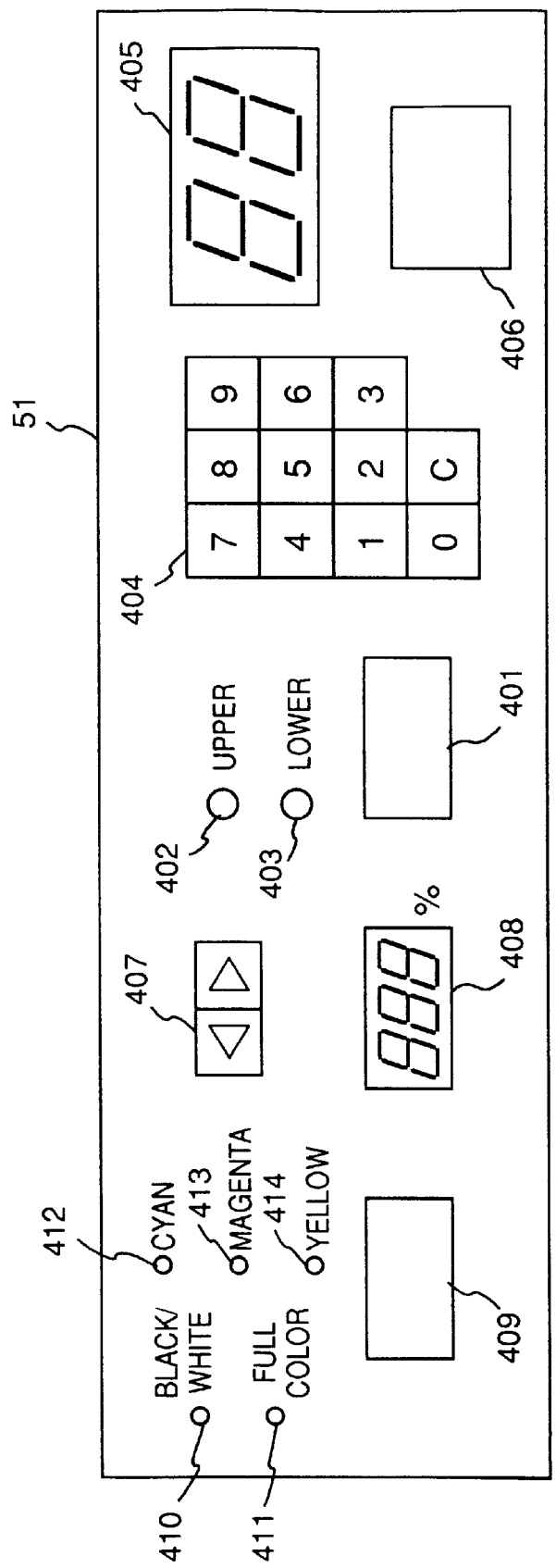

FIG. 7

| INPUT QUANTITY | INPUT DIRECTION | | INPUT MEMORY SEQUENCE | OUTPUT QUANTITY | OUTPUT MEMORY SEQUENCE | OUTPUT DIRECTION | |
|---|---|---|---|---|---|---|---|
| | MAIN SCAN | SUB-SCAN | | | | MAIN SCAN | SUB-SCAN |
| 1 | ↑ | → | a b c d<br>e f g h<br>i j k l | | | | |
| 2 | ↑ | ← | i j k l<br>e f g h<br>a b c d | 1 | a b c d<br>e f g h<br>i j k l | ↑ | → |
| 3 | ↑ | → | i j k l<br>a b c d<br>e f g h | 2 | i j k l<br>e f g h<br>a b c d | ↑ | ← |
| 4 | ↑ | ← | a b c d<br>e f g h<br>i j k l | 3 | i j k l<br>a b c d<br>e f g h | ↑ | ← |
| | | | | 4 | a b c d<br>e f g h<br>i j k l | ↑ | → |

FIG. 10

| | XNOR GATE 123 IN | | AND GATE 124 OUT (SUB-SCAN COUNTER 115 UP/DOWN) | AND GATE 356 OUT | AND GATE 357 OUT | SUB-SCAN COUNTER 115 LD/CL |
|---|---|---|---|---|---|---|
| | BIT 1 | BIT 0 | | | | |
| 1ST PAGE DUPLICATION | 0 | 1 | 0 (UP COUNTER) | 0 | 1 | CL |
| 2ND PAGE DUPLICATION | 1 | 0 | 0 (UP COUNTER) | 0 | 1 | CL |
| 3RD PAGE DUPLICATION | 1 | 1 | 1 (DOWN COUNTER) | 1 | 0 | LD |
| 4TH PAGE DUPLICATION | 0 | 0 | 1 (DOWN COUNTER) | 1 | 0 | LD |
| 5TH PAGE DUPLICATION | 0 | 1 | 0 (UP COUNTER) | 0 | 1 | CL |

IMAGE FORMATION APPARATUS

BACKGROUND OF THE INVENTION

This invention relates to an image formation apparatus and, more particularly to an image formation apparatus having a page memory whose memory capacity is at least one page of A4 size paper (approximately 16 MB), and capable of including a document feeder.

In copying process in a conventional full-color electrophotographic copier, originals are placed on a rotational document feeder (RDF), face up, and supplied one by one to an original table where each original is placed face down. An optical scanning unit scans in a direction (the positive sub-scanning direction: forwarding direction) at a predetermined speed to read an original. A low scanning speed is preferable, if the time that a CCD (Charge Coupled Device) accumulates charge corresponding to lights reflected from the original is considered. On the other hand, in order to increase the entire processing speed of the full-color electrophotographic copier, the returning speed of the optical scanning unit to the home position in the sub-scanning direction needs to be increased.

The structure of the conventional technique is such that an optical scanning unit reads an original by irradiating the original only when scanning in the positive sub-scanning direction. With such structure, when a plurality of original documents are consecutively duplicated by using the RDF, resonance may occur in the entire apparatus due to the long drive time of the driving motor of the optical scanning unit to return to the home position at a high speed.

In order to solve the above problems, even if the original is read in both directions of the sub-scanning direction, since the CCD can read the image only from the positive direction of the main scanning direction, the original read during the returning processing in the sub-scanning direction is a mirror image with respect to the original read in the forwarding processing.

SUMMARY OF THE INVENTION

Accordingly, it is an object of the present invention to provide an image processing apparatus capable of solving the above problems.

It is another object of the present invention to provide an image processing apparatus capable of realizing a high-speed duplicate processing without a heavy load on the drive of the optical scanning unit, when a plurality of originals are duplicated one by one by using an RDF.

According to the present invention, the foregoing object is attained by an image formation apparatus comprising: scanning means for reading an image by scanning with an optical scanning unit; scanning control means for controlling whether the scanning by the scanning means is performed in one direction or both directions, the forward direction and the reverse direction; storage means for storing the image signal read by the scanning means; and output control means for controlling the output of the image signal from the image storage means in accordance with the scanning direction controlled by the scanning control means.

This invention is particularly advantageous since an appropriate image signal is outputted, if the optical scanning unit scans in the forwarding and reversing directions, by once storing the image signal read by irradiating the original by the optical scanning unit into storage means, and controlling the output of the image signal from the storage means in accordance with the scanning direction of the optical scanning unit. Accordingly, the problem of increasing the reading processing speed only in the forwarding direction is solved, the load of the scanning motor by increase of reading speed of the optical scanning unit to return to the home position is reduced, and it is possible to provide an image formation apparatus with a high-speed processing in a consecutive duplication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 3 is a diagram illustrating the construction of the control panel of the first embodiment of the present invention;

FIG. 7 is a diagram illustrating the control of the duplication processing of the first embodiment of the present invention;

FIG. 10 is a diagram illustrating the state of the sub-scanning address counter of the first embodiment of the invention.

DESCRIPTION OF THE PREFERRED EMBODIMENTS

Preferred embodiments of the present invention will now be described in detail in accordance with the accompanying drawings.

[First Embodiment]

Figure 1:
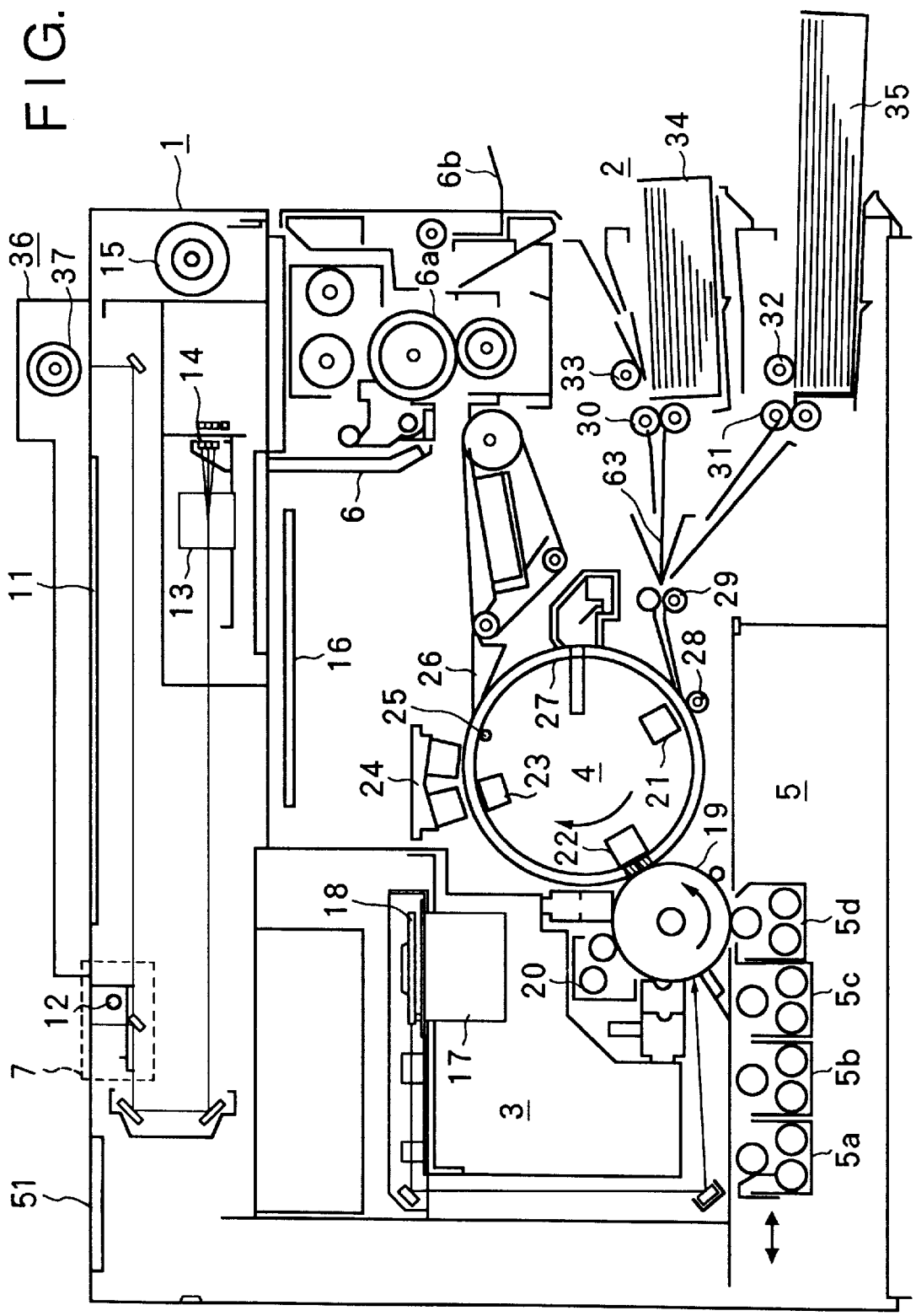
FIG. 1 is a side view of the full-color electrophotographic copier of the first embodiment of the present invention.

FIG. 1 is a side view of the full-color electrophotographic apparatus of the first embodiment according to the invention.

In FIG. 1, numeral 1 is a reader, numeral 2 is a recording paper feeder, numeral 3 is an image formation unit, numeral 4 is an image transfer unit, numeral 5 is a developer, numeral 6 is a fixing unit, and numeral 36 is a rotational document feeder RDF.

The reader 1 is comprised of an original table (platen glass) 11, lamp 12, lens 13, CCD 14 and optical reading drive motor 15. In the embodiment, the CCD 14 has three line sensors which respectively include filter of R (red), G (green) and B (blue), arranged next to each other. Optical information of each line from the 10 original is respectively reflected to the line sensors of R, G, B.

The original scanning unit 7 to which the lamp 12 is incorporated scans/moves at a speed predetermined by the optical reading drive motor 15 in accordance with a predetermined magnification to read the original placed face down on the platen glass 11. In the embodiment, the optical reading drive motor 15 is a DC servo motor where PLL (Phase Locked Loop) control is applied. The moving speed of the forwarding processing in the sub-scanning direction of the optical scanning unit 7 by the optical reading drive motor 15 can be variable from 22.5 mm/sec to 360 mm/sec in accordance with the magnification, and to 800 mm/sec in the return processing in the sub-scanning direction.

Furthermore, a control panel 51 is provided near the platen glass 11. The control panel 51 includes switches for setting various modes concerning duplication processing, a display and an indicator. The detail will be described later.

The recording paper feeder 2 is comprised of paper feeding rollers 30, 31, pick up rollers 32, 33, and removable paper cassettes 34, 35. The recording paper feeder 2 feeds a recording paper 63 in accordance with the drive instruction from the controller 16.

The image formation unit 3 is comprised of a scanner motor 17, polygon mirror 18, photosensitive drum 19 and cleaner 20. In the image formation unit 3, the controller 16 processes a color image signal read by the CCD 14, and generates color separation image signals of magenta, cyan, yellow and black. The laser beam from a laser source forms an electrostatic latent image on the photosensitive drum 19 based on each color signal. The detail of the controller 16 will be described later.

The image transfer unit 4 is comprised of absorbing charger 21, transfer charger 22, separation chargers 23, 24, separation press roller 25, separation claw 26, transferee drum 27, absorbing roller 28 and resist roller 29. The recording paper 63 supplied to the position of the resist roller 29 by the paper feeding roller 30 or 31 has a timing to synchronize with the photo sensitive drum 19 with the leading position of the head of the image. When the head of the recording paper 63 is synchronized with the photo sensitive drum 19, the recording paper 63 is transferred to the transfer drum 27.

The recording paper 63 is charged by the absorption roller 28 and absorption charger 21 which are opposed each other, and wound up around the transfer drum 27 by static electricity. The transfer charger 22 transfers each toner developed on the photo sensitive drum 19 to the recording paper 63.

The developer 5 is comprised of developing units 5a–5d, and a developing sleeve (not shown) is moved to the developing position of the photo sensitive drum 19 by the motor (not shown) by reciprocating in the arrow's direction in the figure. The developing units 5a–5d respectively contain toners of black, yellow, cyan and magenta in this order. An electrostatic latent image formed on the photo sensitive drum 19 is visualized by predetermined toners in the developing units 5a–5d. First, an electrostatic latent image in magenta formed on the photo sensitive drum 19 is developed by the magenta developing unit 5d. The developed magenta image is transferred to the recording paper 63 on the transfer drum 27. Subsequently, an electrostatic latent image in cyan formed on the photo sensitive drum 19 is developed by the cyan developing unit 5c. The developed cyan image is transferred to the recording paper 63 where the magenta image has been formed. Similarly, the images developed by using yellow and black developing units 5b and 5a are sequentially transferred and overlaid on the image on the recording paper 63.

In the fixing unit 6, each toner of black, yellow, cyan and magenta is fixed on the recording paper 63 by a fixing roller 6a. When each color has been fixed, the recording paper 63 is carried to a tray 6b.

The RDF 36 feeds originals one by one so that each original which is placed at face up will be placed at face down on the platen glass 11. The fed original is irradiated by the lamp 12. Numeral 37 is an RDF driving motor.

Figure 2A:
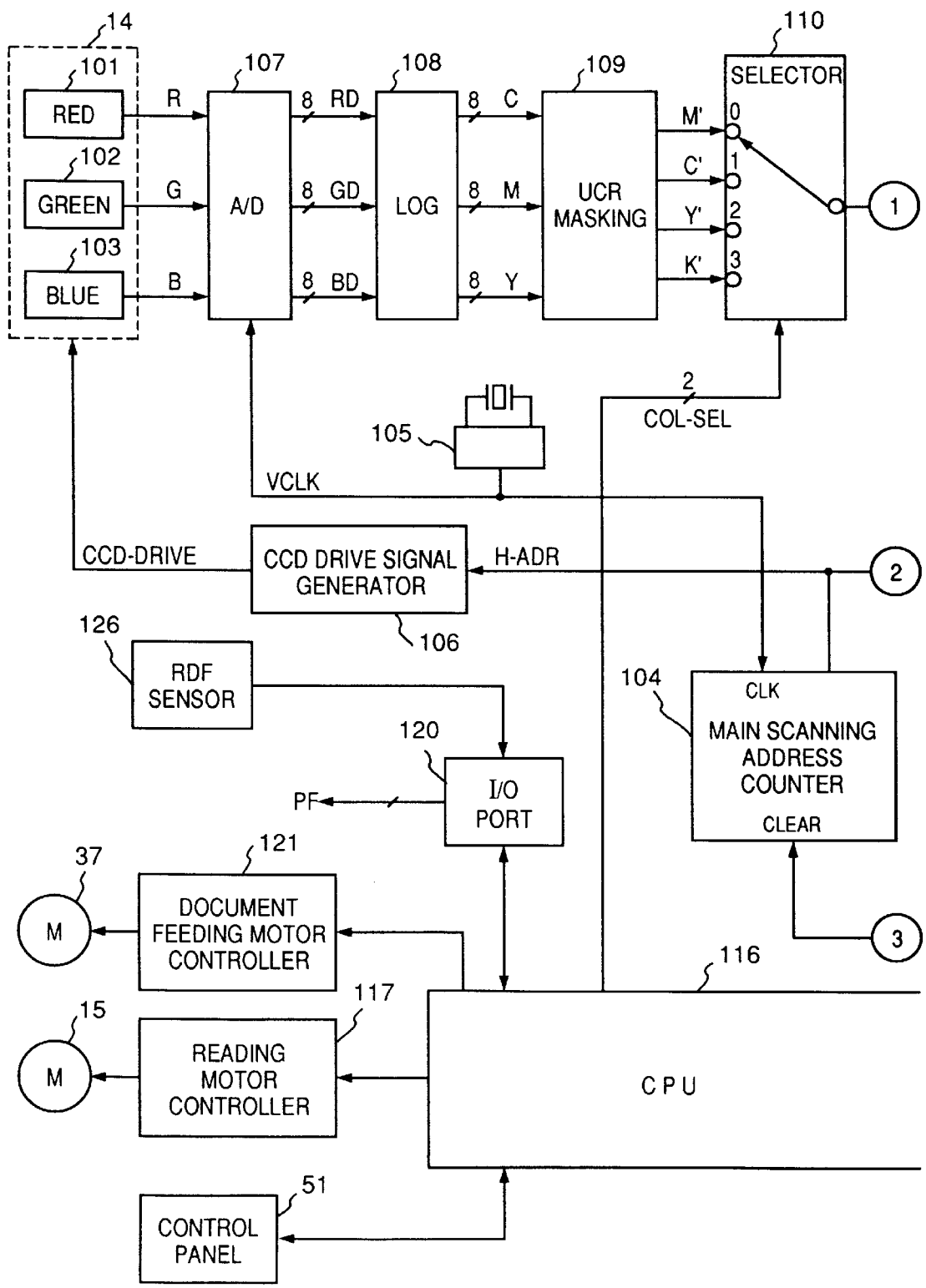
FIGS. 2A and 2B are block diagrams of the controller of the first embodiment of the invention.
Figure 2B:
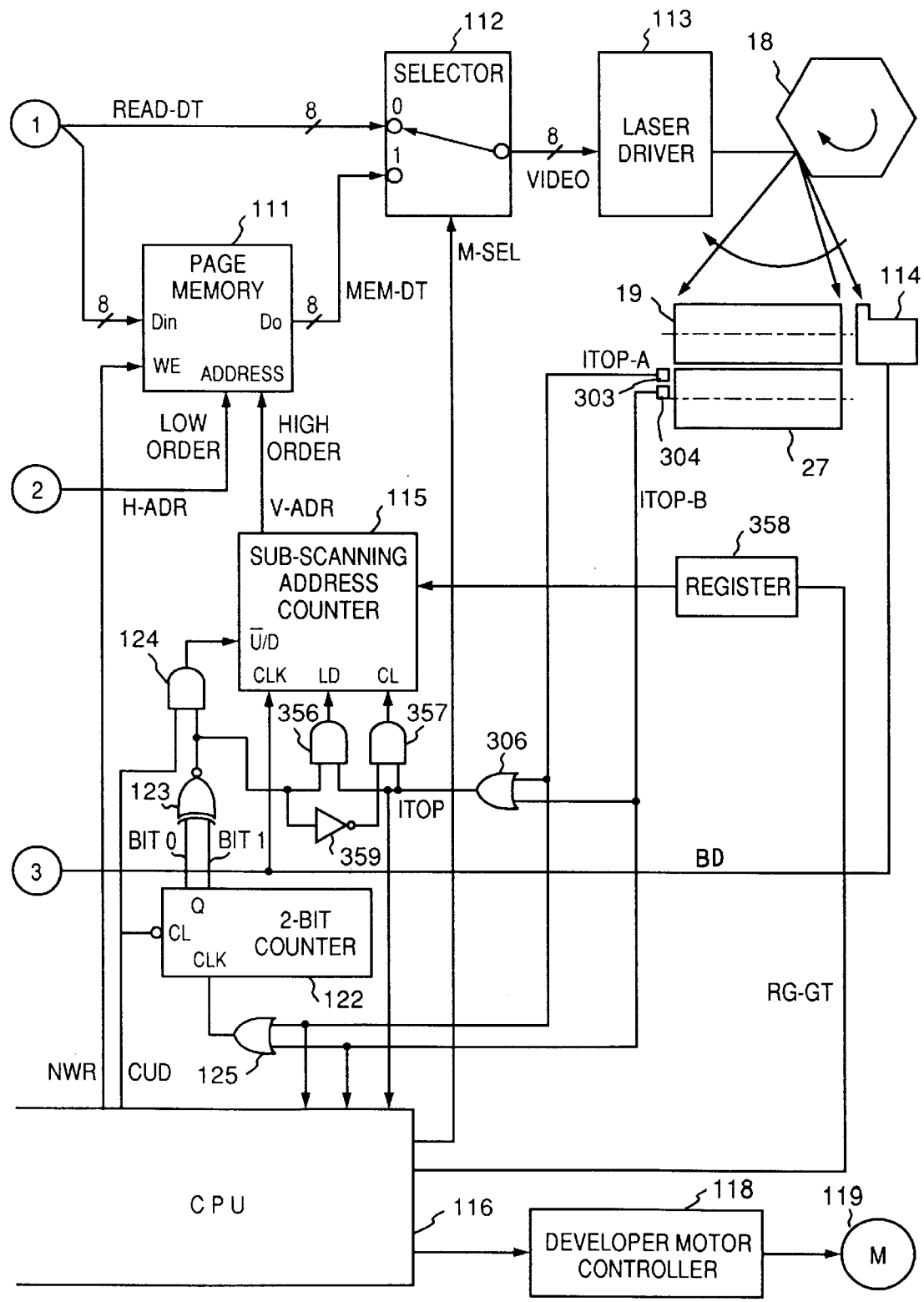

FIGS. 2A and 2B respectively show the block diagram of the controller 16 and the vicinity to be controlled by the controller 16.

The CCD 14 comprising of three line sensors red (R) 101, green (G) 102 and blue (B) 103 performs color separation on luminous information of one line, and outputs electronic signals of R, G, B at the resolution 400 dpi. In the embodiment, to read a line of 297 mm at maximum (the length of A4 paper), the CCD 14 outputs the image of 4677 pixels per line for each of R, G, B.

Numeral 104 is a main scanning address counter which is cleared for each line by a BD (Beam Detect) signal, a synchronizing signal when laser recording is performed in each line on the photo sensitive drum 19. The detail of the BD signal is described later. The main scanning address counter 104 counts VCLK (Vertical synchronizing CLK) signals generated from the pixel clock generator 105, and generates a H-ADR signal (Horizontal Address signal) corresponding to each pixel of the image information of a single line read from the CCD 14. Since the H-ADR signal can be counted from "0" to "5000" which is enough for an image signal of one line read from the CCD 14.

Numeral 106 is a CCD drive signal generator which decodes the H-ADR signal outputted from the main scanning address counter 104, and generates a CCD-DRIVE signal, a reset pulse or transfer clock for the CCD 14. Accordingly, the image signals of R, G, B are sequentially outputted from the CCD 14 to the same pixel in synchronism with the VCLK signal. Numeral 107 is an A/D converter which converts each image signal of R, G, B to 8-bit digital signals.

Numeral 108 is a LOG converter for luminous quantity/density conversion. The LOG converter 108 respectively converts 8-bit luminous quantity signals of R, G, B to 8-bit density signals of C, M, Y. Numeral 109 is a UCR/masking processor which extracts a density signal of black (K') from the density signals of C, M, Y by the under color removal processing, and performs a well-known masking operation to perform color correction of toners corresponding to each density signal.

The selector 110 selects a color signal corresponding to the toner to be used from the density signals M', C', Y', K'. A "COL-SEL (color select)" signal is a 2-bit signal generated from the CPU 116 for color selection, and the following signals are outputted from the selector 110 as READ-DT (read data) signals based on the COL-SEL signal:

M' signal corresponding to magenta, if the COL-SEL signal is "0";

C' signal corresponding to cyan, if the COL-SEL signal is "1";

Y' signal corresponding to yellow, if the COL-SEL signal is "2"; and

K' signal corresponding to black, if the COL-SEL signal is "3".

Numeral 111 is a page memory whose memory capacity is approximately 4 MB, a capacity for a single color of A4 paper.

As an address of the page memory 111, a H-ADR signal in a line outputted from the main scanning address counter 104 is supplied as a low order address, and a line counter output V-ADR (Vertical Address) signal from the sub-scanning address counter 115 is supplied as a high order address. The address of the page memory 111 is generated with synchronism with the timing of the image reading and image recording in the page unit.

Furthermore, switching of the operation between writing and reading to and from the page memory 111 is performed by a port output signal MWR (Modify Write) from the CPU 116. When the port output signal MWR is H (high) level, the operation is switched to the writing operation to the page memory 111, while when L (low) level, to the reading operation from the page memory 111.

Numeral 112 is a selector for selecting the image data READ-DT where the image signal read by the CCD 14 is processed at real time and the data MEM-DT (Memory Data) read from the page memory 111 by the M-SEL (Memory Select) signal inputted from the CPU 116, and outputting the 8-bit VIDEO signal. When the M-SEL signal is L level, the VIDEO signal read by the CCD 14 is outputted at the real time, while when the M-SEL signal is H level, the VIDEO signal read from the page memory 111 is outputted. Numeral 113 is a laser and laser driver for controlling a luminous quantity in accordance with the VIDEO signal, 8-bit density signal. The laser light generated by the laser driver 113 forms an electrostatic latent image of one line on the photo sensitive drum 19 by scanning using the polygon scanner 18 on the photo sensitive drum 19 in the axis direction of the photo sensitive drum 19.

Numeral 114 is a photo detector which is provided in the vicinity of the photo sensitive drum 19. The photo detector 114 detects a passage of laser light before the scanning of the photo sensitive drum 19, and generates the synchronizing signal BD of one line. This BD signal initializes (clears) the main scanning address counter 104.

The sub-scanning address counter 115 is an up/down counter which is initialized by page start signals ITOP-A and ITOP-B signals detected by the photo sensors 303, 304 provided in the vicinity of the transfer drum 27 (which is described later), and generates a counter output in each line. Furthermore, if the CUD signal is L level, the sub-scanning address counter functions as an up counter. While if the CUD signal is H level and the output of XNOR is H level, it is switched from the up counter to the down counter by the output signal from the 2-bit counter 122. By this switching, writing and reading of the data in/from the page memory 111 in the sub-scanning direction are controlled.

The 2-bit counter 122 is an up counter for counting up in synchronism with the ITOP-A signal or ITOP-B signal inputted via an OR gate 125. When the values of the 2-bit counter 122 is "0, 1, 2, 3", the outputs of XNOR 123 are "H, L, L, H" respectively. Only when the output of the XNOR 123 is H level and the CUD signal is H level, the output of the AND 124 is H level. Accordingly, the sub-scanning address counter 115 functions as a down counter. Furthermore, the 2-bit counter 122 is initialized when the CUD signal is L level.

The photo sensors 303 and 304 which generate page synchronizing signals ITOP-A and ITOP-B by detecting that the transfer drum 27 has been rotated to the predetermined position (the position detected by the photo sensors 303 and 304). Numeral 358 is a register for storing a value set in the sub-scanning address counter 115 by an RG-GT signal from the CPU 116. Numeral 306 is an OR gate which passes ITOP-A and ITOP-B. The output of the OR gate 306 is inputted into the CPU 116 and the AND gates 124, 356, 357. The output of the AND gate 356 loads the data stored in the register 358 to the sub-scanning address counter 115. The output of the AND gate 357 clears the sub-scanning address counter 115. Numeral 359 is an inverter.

The CPU 116 controls the operations of image reading and image recording. Numeral 117 is a reading motor controller for controlling the forwarding/reversing and speed of the recording motor 15. Numeral 118 is a developing unit motor controller for controlling a developing unit motor 119 to move the developing units 5a–5d in FIG. 1 to the developing position of the photo sensitive drum 19. Numeral 120 is an I/O port which controls sensors and actuators other than the above-mentioned sensors and actuators required for controlling the duplication operation. The I/O port includes a PF signal, a signal for selecting the paper feeding cassette.

Numeral 121 is an RDF motor controller to supply a plurality of original one by one, and controls the original feeding motor 37. Numeral 126 is an RDF original detecting sensor provided at a predetermined position of the RDF 36 which detects whether or not at least one original exists. Numeral 51 is a control panel where an operator inputs various instructions, and the apparatus state is informed to the operator.

The structure of the control panel 51 is shown in FIG. 3. In FIG. 3, numeral 401 is a recording paper cassette selection key, numeral 402 is a LED display for indicating that the upper cassette is selected, and numeral 403 is a LED display for indicating that the lower cassette is selected. Numeral 404 is a ten key (0–9) pad including a clear key (C) for inputting copy quantity and clearing the input of the ten key. Numeral 405 is a copy quantity indicator, and comprised of seven-segment LED display of two figures. Numeral 406 is a copy start key. Numeral 407 is a key for inputting a magnification, and numeral 408 is a seven-segment LED display of three figures to indicate of magnification.

Furthermore, numeral 409 is a color mode setting switch key. Numeral 410 is a LED display for indicating that a black/white mode is selected. Numeral 411 is a LED display for indicating that a full-color mode is selected. Numerals 412, 413 and 414 are LED displays for indicating that cyan mode, magenta mode and yellow mode are selected respectively.

Figure 4:
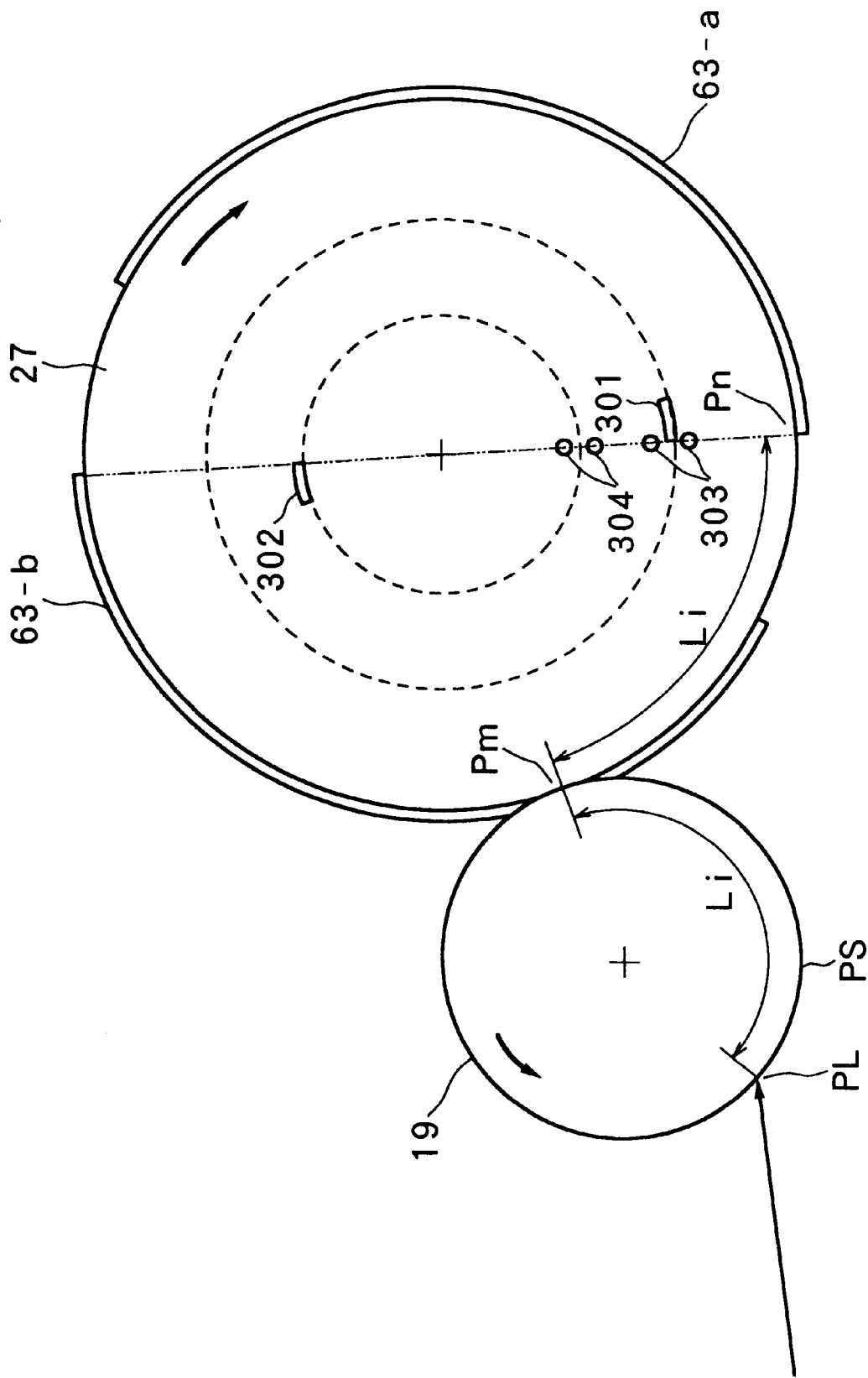
FIG. 4 is a diagram illustrating the construction of the transfer drum of the first embodiment of the present invention.

FIG. 4 is a diagram illustrating the detail of the photo sensitive drum 19 and transfer drum 27.

In the embodiment, the diameter of the transfer drum 27 is approximately 160 mm, and the circumference is approximately 502.6 mm. A sheet of recording paper such as A3 size, B4 size, or legal size is adhered to the peripheral surface of the transfer drum 27. More than two sheets of the paper in the above-mentioned sizes cannot be adhered on the transfer drum 27 because the longer side of the recording paper (the side in the circumferential direction of the transfer drum 27) is greater than the half of the circumference of the transfer drum 27.

When the recording paper size is A4 size or of smaller size, that is, when the longer side of the recording paper is shorter than the half of the circumference of the transfer drum 27, more than two sheets of recording paper can be wound on the transfer drum 27. FIG. 4 shows the state where two sheets of A4 size paper 63-a and 63-b are wound on the transfer drum 27. In FIG. 4, numerals 301 and 302 are flags mounted on the transfer drum 27 for detecting the position of the recording paper on the transfer drum 27. The flags 301 and 302 which rotate along with the transfer drum 27 are detected by the photo sensors 303 and 304 (which will be described later) to detect the position of the recording paper. The photo sensors 303 and 304 are fixed on the apparatus so as to detect passage of the flags 301 and 302 at a predetermined timing (which will be described later).

An electrostatic latent image formed by laser light at the position PL in the circumferential direction of the photo sensitive drum 19 is developed by toners in the portion PS. The developed toner image is transferred to the recording paper 63-a which is wound on the transfer drum 27 at the contacting point Pm of the transfer drum 27 and photo sensitive drum 19. If the distance between the latent image formation point PL and the transfer point Pm is "Li", the recording paper 63-a is wound on the peripheral surface of the transfer drum 27 in advance so that the flag 301 positions at the photo sensor 303 when the head of the recording paper 63-a comes to the position where the distance Li from the transfer point Pm. Similarly, the recording paper 63-b is wound on the peripheral surface of the transfer drum 27 in advance so that the flag 302 positions at the photo sensor 304 when the head of the recording paper 63-b comes to the position where the distance Li from the transfer point Pm. If a latent image formation on the photo sensitive drum 19 is started when the photo sensor 303 or 304 detects the flag 301 or 302, the head of the image is transferred at the head of the recording paper 63-a or 63-b.

When the recording paper is A3, B4 or legal size, only a sheet of paper is wound on the peripheral surface of the transfer drum 27. In this case, the head of the recording paper is set to the same position as that of the recording paper 63-a of FIG. 4. The output of the photo sensor 303 is used for the synchronizing signal of the head of image.

The operation of copy sequence of the embodiment having the structure is described with reference to FIGS. 5A and 5B. Hereinafter, it is assumed that an original is A4 size, and reproduced in black and white. To simplify the description, the number of pixels of one page is determined as 4×3=12 pixels (a-1) as FIG. 6.

FIG. 7 shows the input/output direction of each page and the content of the page memory 111. The "input direction" of FIG. 7 is a scanning direction of the original scanning unit 7, while the "output direction" is an order of outputting the image data of the page memory 111, that is, an up/down direction of the address counter.

Figure 5A:
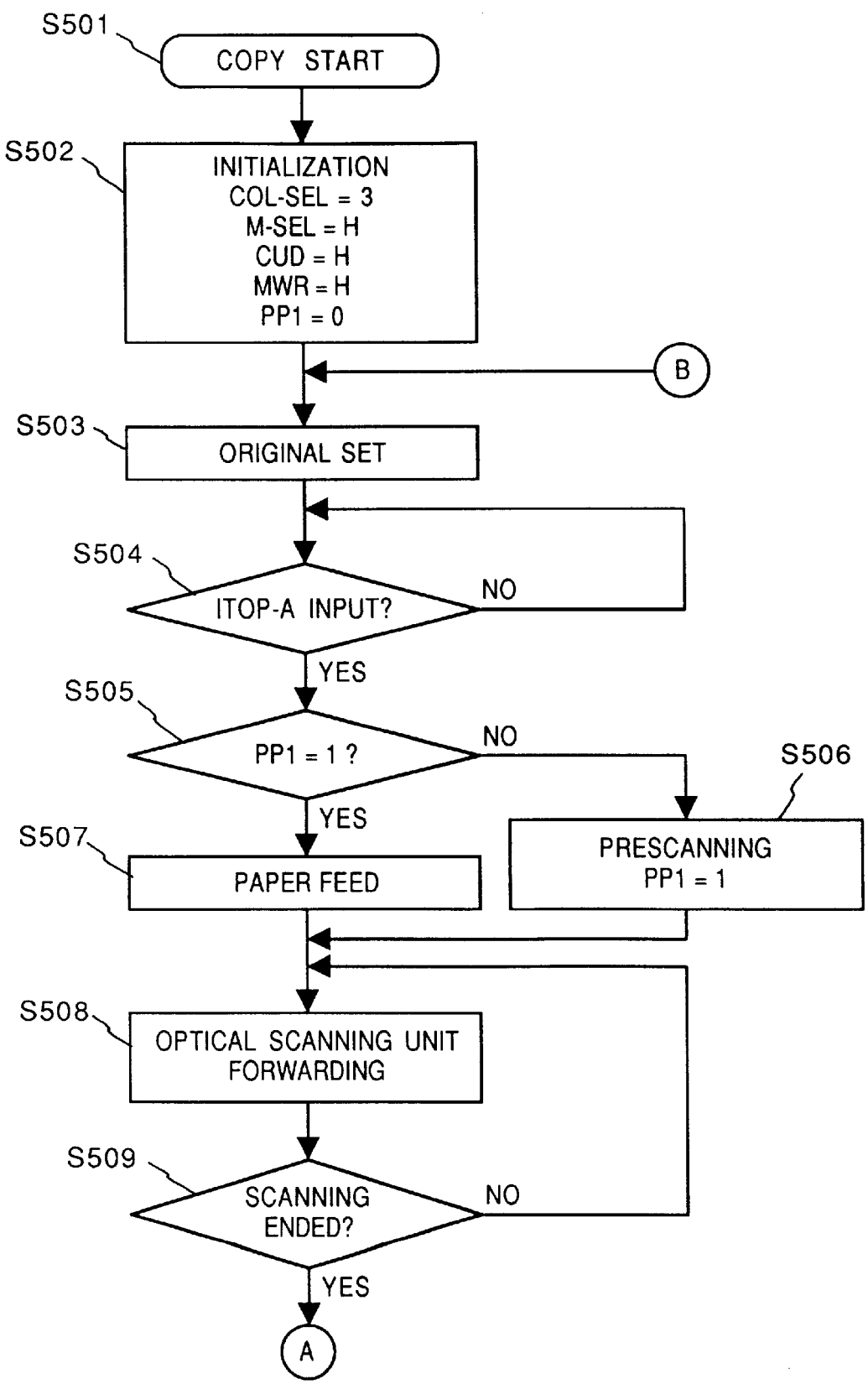
FIGS. 5A and 5B are flowcharts illustrating the duplication processing in the first embodiment of the present invention.

In the flowchart of FIG. 5A, at step S501, when the original is set on the RDF, and the copy start key 406 on the control panel 51 is pressed, the initialization shown in step S502 is performed. Because of the black/white copy, a COL-SEL signal from the CPU 116 is set to "3", and K' signal is selected. An M-SEL signal is H level, and the output from the page memory 111 is selected. A CUD signal to H level, an MWR signal to H level, and a PP1 to "0". Note that "PP1" is a signal indicating whether or not a prescanning is performed. When the prescanning is performed, the PP1 is changed from "0" to "1".

At step S503, a first original is fed from the RDF and set to a predetermined position on the original table 11. At step S504, an input of ITOP-A signal is waited, and when an ITOP-A signal is inputted, the sub-scanning address counter 115 is cleared, and the process proceeds to step S505. At step S505, whether or not the PP1 is "1" is determined. Since the PP1 is "0", indicating that the prescanning has not been performed, the process proceeds to step S506. At step S506, the detection of original size by prescanning and the initialization such as a shading correction are performed, and then the PP1 is set to "1". The process then proceeds to step S508.

Figure 6:
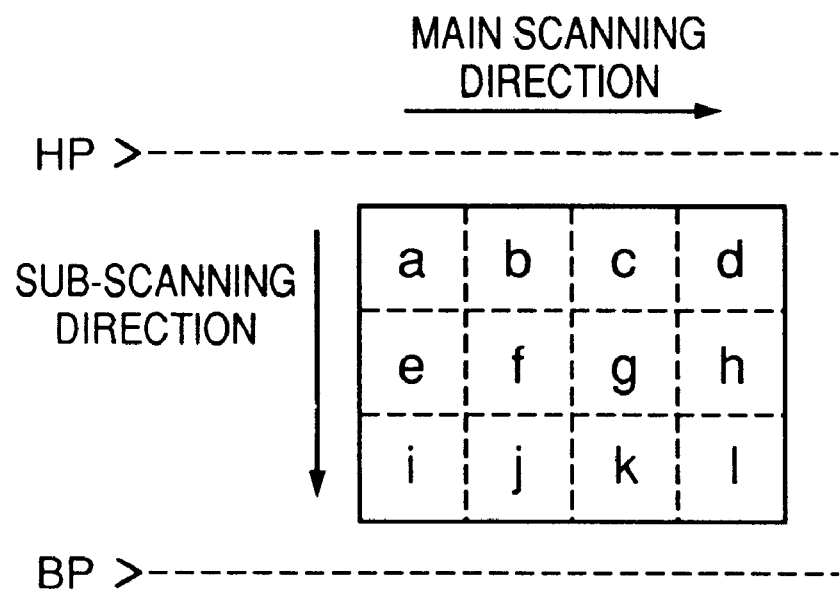
FIG. 6 is a diagram of the original document of the first embodiment of the present invention.

At step S508, the original scanning unit 7 starts scanning from the home position HP shown in FIG. 6. At step S508, the CCD 14 reads the reflected light from the original in each pixel from the beginning of the original in the order of FIG. 6 [a, b, c, d→e, f, g, h→i, j, k, l], and the A/D converter 107 converts input signals to digital luminous quantity signals. In the controller 16 which performs image processing, the LOG converter 108 converts the luminous quantity signal to a density signal, and stores the image signals from the lower order in both the main scanning address and sub-scanning address in the page memory 111. The content of the page memory 111 is in input memory sequence of a first page shown in FIG. 7. In the embodiment, the first page image recording is not performed when the first page is being read/scanned.

At step S509, whether or not the scanning by the original scanning unit 7 has ended is determined. If the scanning has not ended, the process returns to step S508 where the scanning by the original scanning unit 7 is performed. At step S509, when the end of the scanning is determined, as shown in FIG. 6, the original scanning unit 7 is located at the position BP where the motor stop distance from the scanning start position is added to the distance corresponding to the width of A4 paper (210 mm). If the second original exists in the RDF at step S510 (of FIG. 5B), the position of the original scanning unit 7 is not returned to the home position HP, and the RDF sets the second original at the predetermined position of the platen glass 11 at step S511. Furthermore, in the steps S510-1 through S510-3, when the 2-bit counter 122 is "3", the CUD signal is set to L level for initialization.

At step S512, an input of ITOP-B signal into the CPU 116 is waited. When an ITOP-B signal is inputted, the output of the AND gate 356 is L level, and the sub-scanning address counter 115 is cleared. The process proceeds to step S513 where the CPU 116 outputs a PF signal from the I/O port 120, and winds a recording paper on the transfer drum 27 by driving the pick up roller 32 or 33, paper feeding roller 30 or 31, resist roller 29 of the selected paper feeding tray selected in accordance with the PF signal. At this time, the recording system reads image signals, as MEM-DT, sequentially from page memory 111 from the lower order of the main scanning address and sub-scanning address as the up counters, and the recording is started.

Subsequently, at step S514, the original scanning unit 7 scans the original of the second page in the opposite direction to the first page, and reads the image in the order such as [i, j, k, l→e, f, g, h→a, b, c, d]. The controller 16 writes the image signal in the page memory 111 from the low order of the memory address which has ended the output. At step S515, whether or not the scanning has ended is determined. If not ended, the process returns to step S514 where the original scanning unit 7 performs the scanning. While if the scanning has ended, the process proceeds to step S516.

When scanning in the opposite direction has ended at step S515, the content of the page memory 111 is in input memory sequence of a second page shown in FIG. 7. The image of the second page is written in the same address order (from the lower order) in the main scanning direction. On the other hand, in the sub-scanning direction, the sub-scanning address is subject to the count down from the count value corresponding to the maximum number of lines of the A4-size original, and the data is stored in the page memory 111 in the opposite order. The page memory 111 of the embodiment functions as a read modify write mode for writing right after reading of data to an address.

At step S516, if an original of third page exists in the RDF, the process returns to step S503 where the original is set on the platen glass 11. At step S504, when ITOP-A signal is inputted again, the process proceeds to step S505. In this embodiment, since "PP1" is set to "1", the process proceeds to step S507 where the second recording paper is adhered at the predetermined position of the transfer drum 27. At step S508, the scanning of the third original is performed at the same time as the recording of the second page is performed. When the scanning of the second page has been ended, since the original scanning unit 7 is at the original scanning start position (home potion HP), the image signal is read in the order of [a, b, c, d→e, f, g, h→i, j, k, l] as similar to the first page.

To record the second page, since the image needs to be outputted to the printer in the same order as the first page [a, b, c, d→e, f, g, h→i, j, k, l], the main scanning address is read in the same direction as the first page, while the sub-scanning address is in the opposite direction, that is, from the higher order address. Accordingly, the image of the third page read from the lower order address is stored in the address in the opposite order in the sub-scanning direction, as the content of the input memory of the third page in FIG. 7. The register 358 is set with a maximum value when the sub-scanning address counter 115 is operated as a down counter 115 by the RG-GT signal from the CPU 116 in accordance with the original size detected by prescanning.

Subsequently, the scanning of the original scanning unit 7 of the fourth page is performed in the opposite direction in the sub-scanning direction as the second page. Since the image recording of the third page is also outputted in the sub-scanning direction from the higher order address as the second page, the value corresponding to the maximum number of lines of the A4 size is loaded to the sub-scanning address counter in the sub-scanning direction, the storage into the page memory 111 of the fourth page is also performed in the output order, that is, from the higher address in the sub-scanning direction. As a result, the image is stored in the same address arrangement as the first page as shown the input memory content of the fourth page in FIG. 7.

Similarly, the fifth page is the same as the first page, and the sixth page is the same as the second page. Accordingly, the access of the sub-scanning address of the page memory 111 is as following ("n" is natural numbers):

4n page
    read from the higher address;
    write from the lower address
4n+1 page
    read from the lower address;
    write from the lower address
4n+2 page
    read from the lower address;
    write from the higher address
4n+3 page
    read from the higher address;
    write from the higher address Note that FIG. 10 shows the state of the sub-scanning address counter determined from the input to the XNOR 123, outputs of the AND gates 124, 356, 357.

Accordingly, if there is no other original in the RDF 36, at step S517, the MWR signal is set to L level, the page memory 111 is not written, but read. At step S518, if the ITOP-A signal or ITOP-B signal is inputted, at step S519, a recording paper is adhered on the transfer drum 27. At step S520, while the image signal of the last page is read from the page memory 111, the output to the recording paper is performed.

In the above description, the black/white copy mode is described, however, a color copy of magenta, cyan or yellow is also possible. In this case, at the initial setting, COL-SEL signal is set to "0" for magenta, "1" for cyan, and "2" for yellow.

In the above embodiments, the address counter of the page memory 111 is determined as a main scanning address counter 104 and sub-scanning address counter 115. However, the CPU 116 can control the page memory 111 by generating an address directly.

According to the above embodiments, it is possible to provide an image formation apparatus capable of performing a proper image formation when the original is scanned in the both directions of the sub-scanning direction, and continuous plural duplications at a high speed without the load on the optical reading drive motor 15 to return the optical scanning unit 7 by controlling so as to store the image signal read by the optical scanning unit 7 into the page memory 111, and to output the image which is not a mirror image in the same direction to the printer in accordance with the main direction of the scanning unit.

[Second Embodiment]

The first embodiment is effective to a relatively small paper size, a size smaller than A4. However, the first embodiment cannot apply to a large original such as A3 without modifications. This is because the number of pixels of one page is larger than the capacity of the page memory 111 used in the first embodiment, and the sequence of the first embodiment cannot be executed.

Efficient image reading is possible by switching the sequence using the page memory 111 and the sequence for reading an original only in the forward direction and simultaneously writing the image.

For example, when an operator designates a recording paper size through the control panel 51, the memory capacity of reading an original corresponds to the recording paper size. If all pixels of one page of the designated recording paper size (A4, B5, A5) can be stored in the page memory 111, the reciprocating image reading is performed in the sequence of the first embodiment. If the recording paper size is larger than the maximum size to be inputted (e.g. B4, A3), the reciprocating reading operation and the memory control of the first embodiment are not performed. In this case, the copy sequence is switched in the connection with the recording paper input the reading in only the forward direction and a well-known memory control are performed. Otherwise, the copy sequence is switched in accordance with the recording size input such as reading and writing are performed at the same time, without using the page memory 111.

Furthermore, instead of inputting the paper size from the control panel 51, an automatic original document size detection is performed, and the copy sequence can be switched in the connection with the result of the detection.

Since the apparatus structure in the second embodiment is similar to the first embodiment, the description is not needed.

Figure 8:
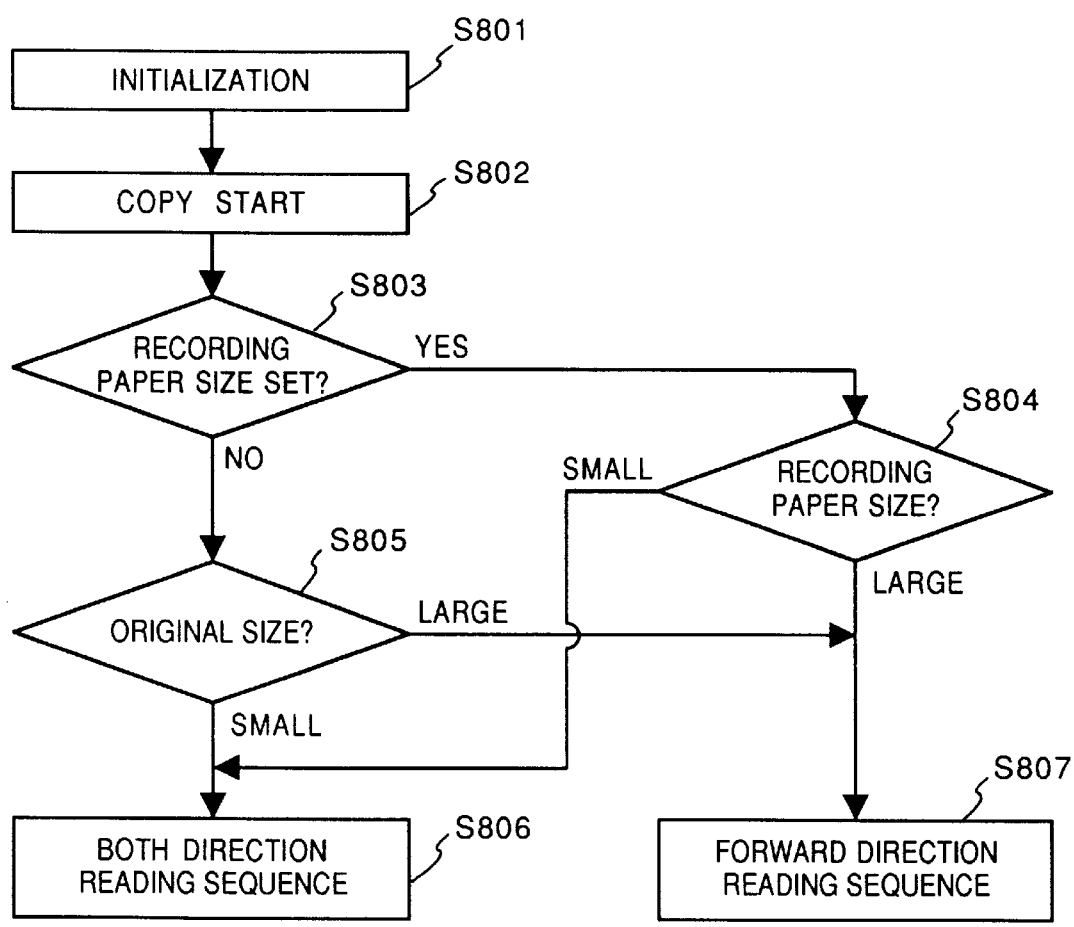
FIG. 8 is a flowchart illustrating the duplication processing of a second embodiment.

The flowchart of the copy sequence in the second embodiment according to the invention is shown in FIG. 8.

In FIG. 8, at step S801, the operator selects an arbitrary paper size by the selection switching key 401 of the recording paper feeding using the control panel 51, or the paper size of the original is detected by detector at step S805. If the copy start key 406 is pressed at step S802, the process proceeds to step S803. If the recording paper size is set by the operator at step S803, the size of the recording paper is determined at step S804.

If the size is small such as A4 at step S804, the reciprocating sequence is executed at step S806, while if the size is large such as an A3 paper, the forward reading sequence is executed at step S807.

Figure 5B:
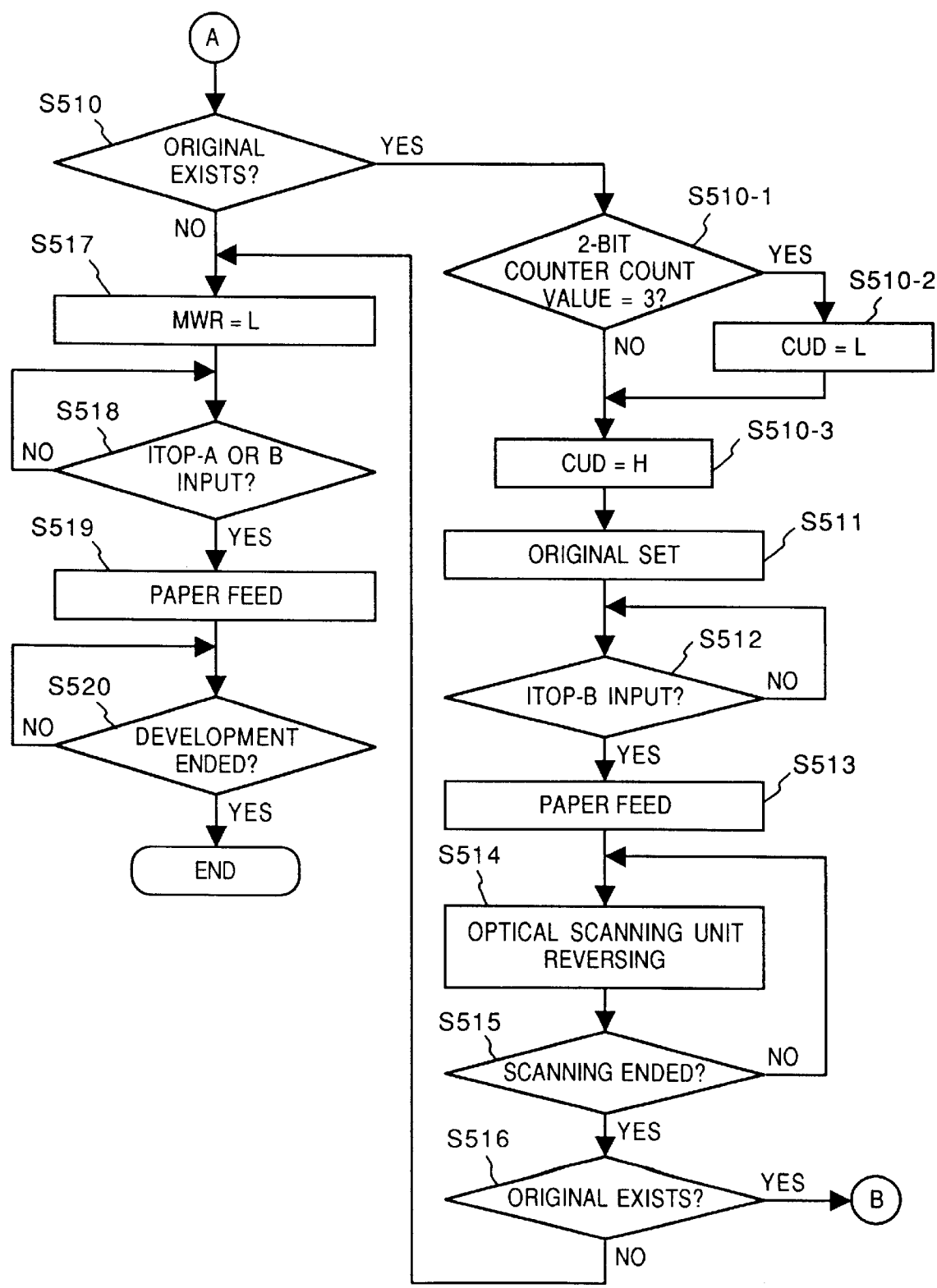

The reciprocating reading sequence at step S806 is a sequence combining the reciprocating reading of the optical scanning unit 7 and the page memory 111 similar to the flowcharts of FIGS. 5A and 5B of the first embodiment. Furthermore, the forward reading sequence at step S807 is a well-known copy sequence, a method directly using reading only in a direction of the optical scanning unit 7 indicated by READ-DT signal of FIG. 2B without using the page memory 111.

If the size is not determined at step S803, the process proceeds to step S805 where a well-known size determination is performed. At step S805, if the original document size is small such as A4, the reciprocating sequence at step S806 is performed, while if the size is large such as A3, the forward reading sequence at step S807 is performed.

As described above, according to the second embodiment, if the original is small, it is possible to provide an image formation apparatus capable of performing a continuous duplication of a plurality of originals at a high speed, without the load on the optical reading drive motor 15 to return the optical scanning unit 7, so as to control reading/writing start address of the page memory 111 in accordance with the scanning direction of the optical scanning unit 7 by once storing the image signal read by the optical scanning unit 7 in the page memory 111, and outputting the image in the same direction which is not a mirror image to a printer. On the other hand, if the original is large, an efficient image reading in accordance with the size of original is possible by switching the sequence using the page memory 111 and the sequence for reading an original only in the forward direction and simultaneously writing the image.

[Third Embodiment]

In the first and second embodiments, the magnification at the duplication is 100%, however, this does not impose a limitation upon the invention, for the magnification can be variable. In the second embodiment, the reciprocating (both-direction) reading sequence can be executed only when the size of original document is smaller than A4 size. However, if an original of A3 size is duplicated, the reciprocating sequence can be executed by reducing the original to A4 size or smaller than A4 size by the reduction processing.

In the third embodiment, switching between the reciprocating reading sequence and the forward direction reading sequence is performed based on the magnification. In the third embodiment, a necessary sequence is switched by combining the original size and magnification so that an output image will be smaller than A4 size. Furthermore, when an original is duplicated for plural sheets, an image signal is stored in the page memory 111, and the image signal can be outputted for plural times in accordance with the copying quantity. In the case of a single-color copy, a plurality of image formations can be performed by a single rotation of the transfer drum. On the other hand, in the case of full-color copy, since an image in a single color is formed by a single rotation, and reading in the reverse direction cannot increase the processing speed, the forward direction reading sequence is performed.

Note that since the structure of the apparatus in the third embodiment is similar to that of the first embodiment, the description is not needed.

Figure 9:
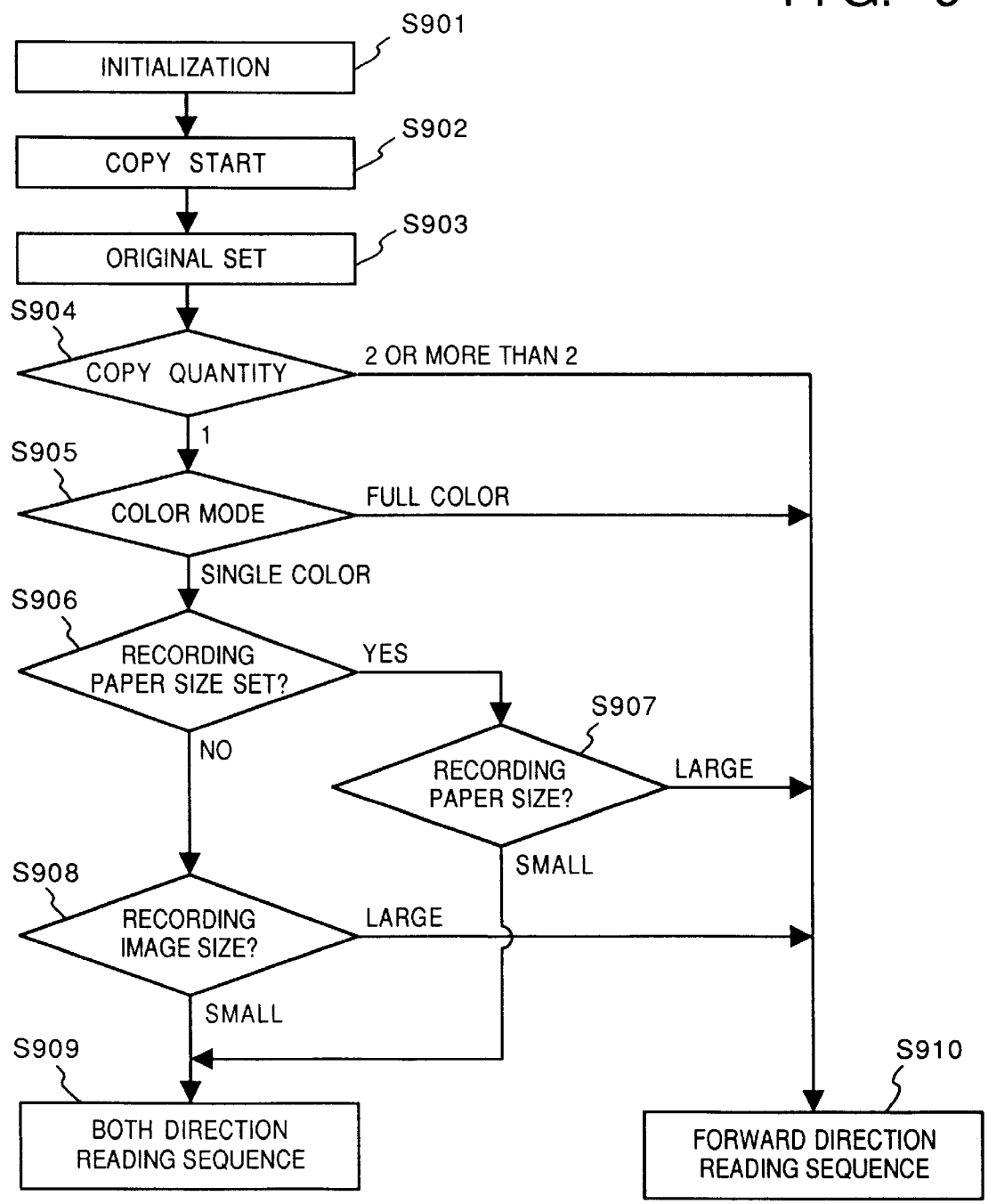
FIG. 9 is a flowchart illustrating the duplication processing of a third embodiment.

FIG. 9 is a flowchart of the copy sequence in the third embodiment.

In FIG. 9, at step S901, an operator sets the size of recording paper, copy quantity, magnification and color mode selection using keys on the control panel 51 shown in FIG. 3.

Subsequently, at step S902, when the copy start key 406 is pressed, the process proceeds to step S903 where an original is placed on the platen glass 11 by the RDF 36.

At step 904, the copy quantity is determined. If the copy quantity is 2 or more than 2, the process proceeds to step S910 where the forward direction reading sequence which is described in the second embodiment is executed. On the other hand, if the copy quantity is "1", the process proceeds from step S904 to step S905 where the color mode is determined. At step S905, if the color mode is a full-color mode, the process proceeds to step S910 where the forward direction reading sequence is executed.

On the other hand, if the color mode is black/white or a single color such as magenta, cyan or yellow, the process proceeds to step S906 where whether or not the recording paper size has been set is examined. If the recording paper size is set, an output recording paper size is determined at step S907. If the output recording paper size is small as A4 size or smaller than A4 size, the process proceeds to step S909 where the reciprocating reading sequence similar to the first embodiment is executed.

On the other hand, if the recording paper size is large as A3 size or larger than A4 size, the process proceeds to step S910 where the forward direction reading sequence is executed.

Furthermore, if the recording paper size is not set at step S906, the process proceeds to step S908 where the output image size is determined. The output image size is obtained by multiplying the original size by the magnification of duplication. If the magnification has not been set in advance, it is automatically set to 100%. If the output image size is smaller than the capacity of the page memory 111, that is, smaller than A4 size, the reciprocating reading sequence is executed, while if it is lager than A4 size, the forward direction reading sequence of S910 is executed.

As described above, according to the third embodiment, an efficient image reading is possible by applying a magnification of the copying apparatus.

As described above, according to the embodiments, it is possible to provide an image formation apparatus capable of performing a continuous duplication of a plurality of originals at a high speed, without the load on the optical reading drive motor 15 to return the optical scanning unit 7, so as to control reading/writing start address of the page memory 111 in accordance with the scanning direction of the optical scanning unit 7 by once storing the image signal read by the optical scanning unit 7 in the page memory 111, and outputting the image in the same direction which is not a mirror image to a printer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image formation apparatus comprising:
   scanning means for reading an original by scanning with an optical scanning unit;
   scanning control means for controlling said scanning means to scan in a forward direction and a reverse direction;
   storage means for storing an image signal for the original read by said scanning means in accordance with a scanning direction;

output control means for controlling output of the image signal from said storage means in accordance with the scanning direction; and image forming means for simultaneously carrying both an image for an original based on an image signal read in the forward direction and an image for another original based on an image signal read in the reverse direction, wherein said image forming means carries only one image in a case that a size of the one image is larger than a predetermined size.

2. The image formation apparatus according to claim 1 further comprising: p1 feeding means for feeding an original document.

3. The image formation apparatus according to claim 2, wherein said feeding means is capable of successively feeding at least two sheets of originals.

4. The image formation apparatus according to claim 1, further comprising:

original size determination means for determining the original size.

5. The image formation apparatus according to claim 4, wherein said scanning control means reads an image in both directions when said original size determination means determines that the original size is smaller than a predetermined size.

6. The image formation apparatus according to claim 5, wherein the small size is an original size whose number of pixels is less than the capacity of said storage means.

7. The image formation apparatus according to claim 6, wherein the capacity of said storage means is for image data of a single color on one page of A4 size paper.

8. The image formation apparatus according to claim 4, wherein said scanning control means reads an image in one direction when said original size determination means determines that the original size is larger than a predetermined size.

9. The image formation apparatus according to claim 8, wherein the large size is an original size whose number of pixels is greater than the capacity of said storage means.

10. The image formation apparatus according to claim 9, wherein the capacity of said storage means is for image data of a single color on one page of A4 size paper.

11. The image formation apparatus according to claim 1, further comprising:

color mode setting means for setting a color mode.

12. The image formation apparatus according to claim 11, wherein said scanning control means reads an image in both directions when the color mode set by said color setting mode is a single color.

13. The image formation apparatus according to claim 11, wherein said scanning control means reads an image in one direction when the color mode set by said color setting mode is a plurality of colors.

14. The image formation apparatus according to claim 11, wherein said scanning control means reads an image in one direction when the color mode set by said color setting mode setting means is a full-color mode.

15. The image formation apparatus according to claim 1, further comprising:

recording size setting means for setting a recording paper size.

16. The image formation apparatus according to claim 15, wherein said scanning control means reads an image in both directions when the recording paper size is smaller than a predetermined size.

17. The image formation apparatus according to claim 16, wherein the small size is an original size whose number of pixels is smaller than the capacity of said storage means.

18. The image formation apparatus according to claim 17, wherein the capacity of said storage means is for image data of a single color on one page of A4 size paper.

19. The image formation apparatus according to claim 15, wherein said scanning control means reads an image in both directions when the recording paper size is larger than a predetermined size.

20. The image formation apparatus according to claim 19, wherein the large size is an original size whose number of pixels is larger than the capacity of said storage means.

21. The image formation apparatus according to claim 20, wherein the capacity of said storage means is for image data of a single color in one page of A4 size paper.

22. The image formation apparatus according to claim 1, further comprising copy quantity setting means for setting continuous copy quantity.

23. The image formation apparatus according to claim 22, wherein said scanning control means reads an image in both directions when the continuous copy quantity set by said continuous copy quantity setting means is one.

24. The image formation apparatus according to claim 22, wherein said scanning control means reads an image in one direction when the continuous copy quantity set by said continuous copy quantity setting means is two or more.

25. The image formation apparatus according to claim 1, further comprising magnification setting means for setting a magnification.

26. The image formation apparatus according to claim 25, wherein said scanning control means reads an image in both directions when the recording paper size obtained by multiplying the original size by the magnification set by said magnification setting means is smaller than the predetermined size.

27. The image formation apparatus according to claim 26, wherein the small size is an original size whose number of pixels is smaller than the capacity of said storage means.

28. The image formation apparatus according to claim 27, wherein the capacity of said storage means is for image data of a single color on one page of A4 size paper.

29. The image formation apparatus according to claim 25, wherein said scanning control means reads an image in both directions when the recording paper size obtained by multiplying the original size by the magnification set by said magnification setting means is larger than the predetermined size.

30. The image formation apparatus according to claim 29, wherein the large size is an original size whose number of pixels is larger than the capacity of said storage means.

31. The image formation apparatus according to claim 30, wherein the capacity of said storage means is for image data of a single color on one page of A4 size paper.

32. The image formation apparatus according to claim 1, further comprising:

recording paper size setting means for setting a recording paper size; and original size determination means for determining the original size.

33. The image formation apparatus according to claim 32, wherein said scanning control means reads an image in both directions if said original size determination means determines that the original size is smaller than a predetermined size, while an image is read in one direction if said original size determination means determines that the original size is larger than a predetermined size, when the recording paper size is not determined by said recording paper size setting means.

34. The image formation apparatus according to claim 1, further comprising:

copy quantity setting means for setting continuous copy quantity;

color mode setting means for setting a color mode;

recording paper size setting means for setting a recording paper size; and magnification setting means for setting a magnification.

35. The image formation apparatus according to claim 34, wherein said scanning control means reads an image in both directions if the recording paper size obtained by multiplying the original size by the magnification set by said magnification setting means is smaller than a predetermined size, while in one direction if the recording paper size is larger than the predetermined size, when the copy quantity set by said continuous copy setting means is one, the color mode setting means is set to a single color, and the recording paper size is not determined by said recording paper size setting means.

36. The image formation apparatus according to claim 34, wherein said scanning control means reads an image in both directions if the recording paper size set by said magnification setting means is smaller than a predetermined size, while in one direction if the recording paper size is larger than the predetermined size, when the copy quantity set by said continuous copy setting means is one, the color mode setting means is set to a single color, and the recording paper size is determined as a size smaller than the predetermined size.

37. An image formation apparatus comprising:

scanning means for scanning an original and generating image data corresponding to the original;

carrier means for simultaneously carrying a first image corresponding to a first original read by said scanning means in a forward direction and a second image corresponding to a second original read by said scanning means in a reverse direction; and image output means for outputting the first image and the second image carried on said carrier means, wherein said carrier means carries only one image in a case that a size of the one image is larger than a predetermined size.

* * * * *

UNITED STATES PATENT AND TRADEMARK OFFICE
CERTIFICATE OF CORRECTION

PATENT NO. : 6,088,132
DATED : July 11, 2000
INVENTOR(S) : Tsuji

It is certified that error appears in the above-identified patent and that said Letters Patent is hereby corrected as shown below:

Column 10:
Line 8, "the" (second occurrence) should be deleted.

Column 12:
Line 30, "lager" should read -- larger --.

Column 13:
Line 12, "p1" should be deleted.

Signed and Sealed this

Twenty-first Day of August, 2001

Attest:

*Nicholas P. Godici*

NICHOLAS P. GODICI
*Attesting Officer*      *Acting Director of the United States Patent and Trademark Office*